Patented Mar. 18, 1941

2,235,700

UNITED STATES PATENT OFFICE 2,235,700

TEA EXTRACT AND PROCESS OF PRODUCING THE SAME

Frank R. Eldred, Mount Tabor, and Ray N. Reed, Midvale, N. J.

No Drawing. Application October 12, 1939, Serial No. 299,100

15 Claims. (Cl. 99—77)

The present invention relates to the preparation of tea extracts of the type wherein desired constituents are extracted from raw materials by the application of suitable solvents. After extraction the soluble content may be concentrated by removal of part or all of the solvent.

The invention has for an object to provide an improved method for producing extracts of tea whereby the aroma and flavor of the tea treated can be best reproduced in the extract.

Another object is to provide a method whereby certain ingredients may be effectively extracted by cold water.

The invention has been developed in the preparation of liquid and dry extracts of tea and provides an effective process whereby one may prepare concentrates containing the extracts of the natural tea leaves which give the flavor and aroma to the beverage. These concentrates may be in powder or liquid form and are suitable for making a beverage by the mere addition thereof to either hot or cold water in which they are completely soluble. They are also particularly suitable for making carbonated beverages.

It has been discovered in accordance with the present invention that the extraction of certain ingredients from tea leaves is better accomplished if the air is removed from the tea leaves by subjecting them to a vacuum before extracting with water or other solvent.

It has also been discovered that substantial advantages are obtained by combining in the extract the constituents of the tea leaves which are soluble in cold water with the constituents which are volatile with steam while omitting from the extract those constituents which are soluble in hot water, but not soluble in cold water nor volatile with steam.

It has been discovered furthermore in accordance with the invention that the quality of the tea extract can be improved by raising the pH value of the extract above normal as by adding sodium carbonate, sodium hydroxide or other suitable alkali.

For the purposes of illustrating the principles of the invention, the process in its preferred form as applied to the production of tea extracts will be more particularly described.

The quality of tea as a beverage made directly from the leaves as is the most common practice depends in large part on the care with which it is prepared. In order to obtain the most satisfactory flavor and aroma, the water should be the optimum temperature and it should remain at a suitable temperature for a proper time to insure the desired extraction. Ordinarily the water should be and remain at substantially the boiling temperature but without actually boiling during the brewing of the tea.

The best conditions cannot in all cases conveniently be maintained, as, for example, in restaurant service or wherever it is necessary or desirable to prepare and serve tea one cup at a time.

For such reasons and for other reasons involving convenience to the user and the advantages of assured quality there is a considerable demand for a concentrated tea extract and numerous attempts have been made to produce such an extract in solid or in concentrated liquid form.

Heretofore it has been generally assumed that in order properly to extract the constituents which give the aroma and flavor, it is necessary to brew tea in water at the boiling temperature. Cold water has failed to extract the desirable tannins, color and aroma even when the extraction was continued for a long time. Moreover, if the extraction is continued too long, fermentative changes take place which destroy the flavor of the infusion. On the other hand when hot water is used substances are extracted which are insoluble in cold water and which make it very difficult to clarify the extract. Furthermore, a high temperature method cannot readily be applied to large quantities of tea without maintaining the high temperature for too long a time for best results. Prolonged high temperature causes chemical changes which adversely affect the color, flavor and solubility of the resulting extracts.

We have discovered that the difficulty of properly extracting tea with cold water is very largely due to the air (or possibly other gas) contained in the interstices and cells of the tea leaves and that if this air is removed the extraction will proceed very rapidly and a satisfactory extract can be prepared with cold water.

As the most readily available method for the removal of the air, the tea is subjected to vacuum treatment, the higher the vacuum the more effectively the air is removed. The time of exposure necessary for effective results will depend upon the degree of vacuum and the character of the tea. Satisfactory results have been obtained by treating ordinary tea leaves under a vacuum of about 740 mm of mercury for 15 to 45 minutes.

The tea so extracted still retains a large proportion of the volatile aromatic constituents which should be removed and added to the cold water extract. It is possible to extract these constituents with hot water but decidedly better results are obtained if they are removed by steam distillation and added to the cold water extract. By this procedure the desirable aromatic constituents of the tea leaves are more completely extracted and saved while certain ingredients which are neither soluble in cold water nor volatile with steam and which ingredients give a bitter taste to the tea are discarded with the spent leaves.

In accordance with the preferred procedure the cold water soluble content is first extracted from the tea leaves. This is done by admitting cold water at 0° to 30° or even 50° C., but preferably at about 22° C., to the vacuum retort in which the tea has previously been vacuum treated so that the tea is thoroughly wet while the tea is still subject to the vacuum.

The pressure in the extracting vessel is then preferably increased to atmospheric pressure or above to insure more effective penetration of the water into the cellular structure of the tea. The water may stand on the tea for from 3 to 18 hours. Excellent results have been obtained by extracting for 6 to 8 hours at a temperature of 20° to 25° C.

It is desirable that the air ordinarily dissolved in water be at least partially removed, as, for example, by heating and then cooling or by subjecting the same to a vacuum before it is admitted to the tea.

A greater proportion of certain constituents of the tea, notably the tannins, is extracted if a sugar such as sucrose, dextrose or lactose is mixed with the tea leaves or introduced into the extracting water. Substances other than sugar which peptise the tannins, such as various gums, as acacia, may also be used to advantage, either with or without sugar.

The extract obtained may be and preferably is concentrated by removing the water by distillation at very low pressures. This extract contains some volatile aromatic constituents and the distillation should be carried on at a very low temperature in order to avoid loss of such volatile substances and to prevent changes in the flavor of the solids dissolved in the water. At a temperature of 50° C. much of the aromatic content will pass over into the distillate and certain non-volatile substances will undergo changes that result in an undesirable flavor. The distillation should therefore be carried on at a temperature below 50° and as a matter of fact, preferably below 20° C. The aroma and flavor of the extract and of the beverage to be made therefrom is further improved by extracting from the tea leaves which have already been extracted with cold water, or from other tea leaves if desired, the aromatic volatile oils which supply the aroma of tea and adding these constituents to the concentrated extract. This is preferably accomplished by steam distillation at atmospheric or higher pressure, the distillate being concentrated by one or more re-distillations and this aromatic concentrate added to the first described concentrate. The water may be further removed from the combined extract and distillate and if the distillation for this purpose is carried on at a very low temperature and pressure, most of the desired aromatic content is retained in the resulting extract even when the extract is reduced to a dry powder. This is based on the well known principle that in the steam distillation of those substances which have a boiling point above the boiling point of water they pass into the distillate in smaller proportions as the pressure is reduced. This distillation may be carried on, for example, at a temperature of 15° to 18° C. and at an absolute pressure of 20 mm. or less of mercury.

There are certain constituents in tea leaves which are soluble in hot water but not soluble or only slightly soluble in cold water and which are not volatile with steam, for which reason they are not found in either the cold water extract as above described or in the volatile content obtained by steam distillation. The extract prepared as herein described has a better flavor because of the omission of these constituents. This fact will be readily understood if one considers the disagreeable bitter taste of tea which has been boiled for even a few minutes or even brewed in boiling water for too long a time. It is because of this bitter content that it is necessary, in order to prepare a good cup of tea, to limit the time of contact with the boiling hot water to a few minutes. On the other hand, during the steam distillation the tea leaves may be subjected to the steam or even to boiling water in the process of steam distillation for a considerable time, even an hour or more, and in any event for as long a time as is necessary to extract practically all of the ingredients volatile with the steam. All of the hot water soluble material not volatile with steam which is objectionable as giving a bitter taste to the tea remains in the still and does not pass over the steam. This is of course discarded.

The product of the process in its preferred form therefore contains only the cold water soluble content of the tea leaves and the content volatile with steam during the steam distillation. This is a different product from extract that is made by the use of hot water and a tea beverage made with it is even different from the tea beverage brewed with hot water on fresh leaves in accordance with the usual practice.

The quality of tea extracts and particularly the flavor and aroma of tea extracts produced as herein described is substantially improved if the pH value is raised toward the neutral point by the addition of a suitable alkali. Usually it is preferable to raise the pH value to about the range pH 6 to pH 7 with an optimum of about pH 6.5. In other words the pH value is adjusted substantially toward the neutral point reducing the acidity. The pH value of the extract normally produced will vary with the variety of the tea leaves treated. It may be as low as pH 5 or even lower. Any increase of the pH value will improve the tea but usually the most satisfactory results are obtained by raising the pH value about 1 or 2 points toward the neutral.

The most suitable alkalies for this purpose are sodium bicarbonate and sodium hydroxide but other alkalies may be used as may well be understood by the chemist. Reduction of acidity of itself renders the tea more healthful.

Good results have been obtained by adding the alkali, particularly sodium carbonate, to the extract after it has been produced and concentrated but it is to be understood that the invention is not limited to this time of adding the alkali. Certain advantages may be obtained by adding the alkali earlier as for example during the extraction of the cold water soluble ingredients or during the steam distillation of the volatile ingredients.

It is one of the advantages of the omission of the hot water soluble content mentioned, that the extract of the present invention when used to produce a cold carbonated or other cold beverage, produces an entirely clear beverage, without any cloud or sediment because of the presence of constituents which are insoluble in cold water. The perfect clearness continues when the beverage is chilled to 10° C. or even to freezing temperature.

Any sugar or other material added for the purpose of rendering the tannins more soluble will assist in retaining the aromatic constituents when preparing a dry extract.

If it is not desired to produce a dry extract, sugar may be added to the mixed concentrated distillate and extract to produce a syrup that may be used for the preparation of hot or cold tea. Such a syrup can be carbonated by the process ordinarily used for the production of carbonated beverages. We have prepared such a carbonated tea beverage of a clear, stable and satisfactory character for the first time although unsuccessful efforts to produce such a beverage have heretofore been made.

The foregoing particular description is illustrative merely and is not intended as defining the limits of the invention. The invention involves the discovery that tea leaves when subjected to the described treatment can be made to yield an extract soluble in cold water containing a better proportion of certain principles which give flavor and aroma to the beverage made therefrom than was possible by means of prior known processes. The extract made in accordance with the preferred procedure described whether in the powder or liquid form is completely soluble in cold water, that is to say in water at any temperature between freezing and room temperature. It has not been possible to obtain such a completely soluble product by the processes heretofore used except by adding acid or other constituents to promote clarification or solubility. Water has been mentioned as the solvent used in the making of the extract both for extracting the cold soluble constituents and for extracting the aromatic oils at high temperatures and especially by steam distillation, but it will be understood that the invention is not necessarily limited to the use of this particular solvent. The steam distillation may be carried on at normal atmospheric pressure but obviously it may be carried on at higher or lower pressures if desired having in mind the characteristics of the particular volatile components desired as ingredients of the extract to be produced.

This application is in part a continuation of application Serial No. 55,678 filed December 21, 1935.

We claim:

1. The process of producing a concentrated tea extract which comprises removing the air from tea leaves by subjecting the leaves to a high vacuum, applying cold water to the leaves while still subjected to vacuum to extract cold water soluble constituents, extracting in vapor phase the volatile constituents from tea leaves at a boiling temperature, and combining the volatile constituents with the cold water soluble constituents.

2. The process of producing a concentrated tea extract which comprises removing the air from tea leaves by subjecting the leaves to a high vacuum, applying cold water to the leaves while still subjected to vacuum to extract cold water soluble constituents, subjecting the same leaves to steam distillation to remove volatile constituents and combining the cold water soluble constituents and the distillate.

3. The process of producing a concentrated tea extract which comprises removing the air from tea leaves by subjecting the leaves to a high vacuum, applying cold water to the leaves while still subjected to vacuum to extract cold water soluble constituents, subjecting the same leaves to steam distillation to remove the volatile constituents, concentrating the extracted cold water soluble constituents and the distillate, combining the two and concentrating further by evaporation at a low pressure and a low temperature to prevent the excessive escape of the more volatile constituents.

4. The process of producing a concentrated tea extract which comprises extracting the leaves with cold water to obtain cold water soluble constituents, subjecting the same leaves to steam distillation to obtain volatile constituents, and combining the volatile constituents with the cold water soluble constituents.

5. The process defined in claim 4 characterized by extraction of the cold water soluble constituents at a temperature of about 22° C.

6. The process of producing a concentrated tea extract which comprises extracting the leaves with cold water to obtain cold water soluble constituents, subjecting the same leaves to steam distillation to obtain volatile constituents, combining the volatile constituents with the cold water soluble constituents and adding alkali to decrease the acidity to about pH 6 to pH 7.

7. A syrup for use in the preparation of a carbonated beverage or other beverage consisting of a tea extract and sugar, said extract consisting of only the cold water soluble constituents of tea leaves and the constituents volatile with steam and not containing the constituents soluble in hot water but neither soluble in cold water nor volatile with steam.

8. A clear carbonated beverage consisting of a tea extract containing only the constituents of tea leaves soluble in cold water and the constituents volatile with steam, sugar and carbonated water but not containing the constituents soluble in hot water which are neither soluble in cold water nor volatile with steam.

9. A syrup for use in the preparation of a carbonated beverage consisting of the extracts of tea soluble in cold water and the constituents volatile with steam, but not containing the constituents soluble in hot water which are neither soluble in cold water nor volatile with steam.

10. A tea extract comprising the constituents of tea leaves soluble in cold water and the constituents volatile with steam, but not containing the constituents soluble in hot water which are neither soluble in cold water nor volatile with steam.

11. A syrup for use in the preparation of a carbonated beverage consisting of the extracts of tea soluble in cold water and the constituents volatile with steam, but not containing the constituents soluble in hot water which are neither soluble in cold water nor volatile with steam, said syrup having a pH value of about pH 6 to pH 7.

12. A tea extract comprising the constituents of tea leaves soluble in cold water and the constituents volatile with steam, but not containing the constituents soluble in hot water which are neither soluble in cold water nor volatile with steam, said extract having a pH value of about pH 6 to pH 7.

13. A tea extract comprising the constituents of tea leaves soluble in cold water and the constituents volatile with steam, but not containing the constituents soluble in hot water which are neither soluble in cold water nor volatile with steam, said extract having a pH value of about 6.5.

14. The process of producing a concentrated tea extract which comprises extracting the leaves with cold water to obtain cold water soluble constituents, subjecting the same leaves to steam distillation to obtain volatile constituents, combining the volatile constituents with the cold water soluble constituents and adding alkali to decrease the acidity.

15. A tea extract comprising the constituents of tea leaves soluble in cold water and the constituents volatile with steam, but not containing the constituents soluble in hot water which are neither soluble in cold water nor volatile with steam, wherein the normal acidity of the extract is decreased by an alkali.

FRANK R. ELDRED.
RAY N. REED.